(12) United States Patent
Jiang

(10) Patent No.: US 7,590,417 B2
(45) Date of Patent: Sep. 15, 2009

(54) METHOD, SYSTEM AND COMPUTER PROGRAM PRODUCT FOR COUNTERING ANTI-TRAFFIC REDIRECTION

(75) Inventor: John Yue Jun Jiang, Danville, CA (US)

(73) Assignee: Roamware Inc., San Jose, CA (US)

( * ) Notice: Subject to any disclaimer, the term of this patent is extended or adjusted under 35 U.S.C. 154(b) by 91 days.

(21) Appl. No.: 11/374,427

(22) Filed: Mar. 14, 2006

(65) Prior Publication Data

US 2006/0246897 A1 Nov. 2, 2006

Related U.S. Application Data

(63) Continuation-in-part of application No. 10/635,804, filed on Aug. 5, 2003, now Pat. No. 7,072,651.

(60) Provisional application No. 60/662,031, filed on Mar. 14, 2005.

(51) Int. Cl.
*H04W 4/00* (2006.01)

(52) U.S. Cl. ............... 455/432.3; 455/435.1; 455/435.2; 455/456.1

(58) Field of Classification Search ............ 455/433, 455/456, 435.1, 456.1, 435.2, 432.3
See application file for complete search history.

(56) References Cited

U.S. PATENT DOCUMENTS

| | | | |
|---|---|---|---|
| 5,353,328 A | 10/1994 | Jokimies | |
| 5,586,166 A | 12/1996 | Turban | |
| 5,742,910 A | 4/1998 | Gallant et al. | |
| 5,764,730 A | 6/1998 | Rabe et al. | |
| 5,818,824 A | 10/1998 | Lu et al. | |
| 5,854,982 A | 12/1998 | Chambers et al. | |
| 5,901,359 A | 5/1999 | Malmstrom | |
| 5,903,832 A | 5/1999 | Seppanen et al. | |
| 5,930,701 A | 7/1999 | Skog | |
| 5,940,490 A | 8/1999 | Foster et al. | |
| 5,943,620 A | 8/1999 | Boltz et al. | |
| 5,953,653 A | 9/1999 | Josenhans et al. | |
| 5,987,318 A | 11/1999 | Alperovich et al. | |
| 5,987,323 A | 11/1999 | Huotori | |
| 5,987,325 A | 11/1999 | Tayloe | |
| 6,014,561 A | 1/2000 | Mölne | |
| 6,052,604 A | 4/2000 | Bishop et al. | |
| 6,058,309 A * | 5/2000 | Huang et al. ............... 455/433 |

(Continued)

FOREIGN PATENT DOCUMENTS

CA 2281041 A1 2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner*—Alexander Eisen
*Assistant Examiner*—Wayne Cai
(74) *Attorney, Agent, or Firm*—Arent Fox LLP

(57) ABSTRACT

A method and system for countering anti-traffic redirection of a roaming mobile station is provided. Observing registration messages exchanged between the visiting network and the home network, the disclosed invention detects if the visiting network has deployed an anti-traffic-redirection mechanism as aimed at fooling the home network into permitting connection with a non-preferred network. The invention also provides for a way to steer the roamer to reattempt connection with a preferred network.

6 Claims, 5 Drawing Sheets

U.S. PATENT DOCUMENTS

| | | | |
|---|---|---|---|
| 6,075,855 A | 6/2000 | Christiansen et al. | |
| 6,085,084 A | 7/2000 | Christmas | |
| 6,138,005 A | 10/2000 | Park | |
| 6,138,009 A | 10/2000 | Birgerson | |
| 6,148,197 A | 11/2000 | Bridges et al. | |
| 6,163,701 A | 12/2000 | Saleh et al. | |
| 6,185,295 B1 | 2/2001 | Frederiksen et al. | |
| 6,185,436 B1 | 2/2001 | Vu | |
| 6,192,255 B1 | 2/2001 | Lewis et al. | |
| 6,195,532 B1 | 2/2001 | Bamburak et al. | |
| 6,208,864 B1 | 3/2001 | Agrawal et al. | |
| 6,212,372 B1 | 4/2001 | Julin | |
| 6,356,755 B1 * | 3/2002 | Valentine et al. | 455/435.1 |
| 6,356,756 B1 | 3/2002 | Koster | |
| 6,456,845 B1 | 9/2002 | Drum et al. | |
| 6,456,859 B1 | 9/2002 | Desblancs et al. | |
| 6,463,298 B1 | 10/2002 | Sorenson et al. | |
| 6,466,786 B1 | 10/2002 | Wallenius | |
| 6,505,050 B1 | 1/2003 | Brudos et al. | |
| 6,515,974 B1 | 2/2003 | Inoue et al. | |
| 6,574,481 B1 | 6/2003 | Rathnasabapathy et al. | |
| 6,603,761 B1 | 8/2003 | Wang et al. | |
| 6,603,968 B2 | 8/2003 | Anvekar et al. | |
| 6,611,516 B1 | 8/2003 | Pirkola et al. | |
| 6,628,934 B2 | 9/2003 | Rosenberg et al. | |
| 6,636,502 B1 | 10/2003 | Lager et al. | |
| 6,671,523 B1 | 12/2003 | Niepel et al. | |
| 6,684,073 B1 | 1/2004 | Joss et al. | |
| 6,693,586 B1 | 2/2004 | Walters et al. | |
| 6,738,622 B1 | 5/2004 | Stadelmann et al. | |
| 6,738,636 B2 | 5/2004 | Lielbridis | |
| 6,764,003 B1 | 7/2004 | Martshitsch et al. | |
| 6,782,264 B2 | 8/2004 | Anderson | |
| 6,795,444 B1 | 9/2004 | Vo et al. | |
| 6,856,818 B1 | 2/2005 | Ford | |
| 6,876,860 B1 | 4/2005 | Berg et al. | |
| 6,920,487 B2 | 7/2005 | Sofer et al. | |
| 6,925,299 B1 | 8/2005 | Sofer et al. | |
| 6,961,559 B1 | 11/2005 | Chow et al. | |
| 6,963,543 B2 | 11/2005 | Diep et al. | |
| 6,968,383 B1 | 11/2005 | Heutschi et al. | |
| 6,975,852 B1 | 12/2005 | Sofer et al. | |
| 6,978,156 B1 | 12/2005 | Papadopoulos et al. | |
| 7,020,479 B2 | 3/2006 | Martschitsch | |
| 7,139,570 B2 | 11/2006 | Elkarat et al. | |
| 7,184,764 B2 | 2/2007 | Raviv et al. | |
| 7,231,431 B2 | 6/2007 | Sofer et al. | |
| 2002/0009199 A1 | 1/2002 | Ala-Laurila et al. | |
| 2002/0012351 A1 | 1/2002 | Sofer et al. | |
| 2002/0037708 A1 | 3/2002 | McCann et al. | |
| 2002/0087631 A1 | 7/2002 | Sharma | |
| 2002/0101858 A1 | 8/2002 | Stuart et al. | |
| 2002/0101859 A1 | 8/2002 | Maclean | |
| 2002/0160763 A1 | 10/2002 | Mittal et al. | |
| 2002/0187780 A1 | 12/2002 | Souissi | |
| 2002/0191575 A1 | 12/2002 | Kalavade et al. | |
| 2002/0196775 A1 | 12/2002 | Huotori | |
| 2003/0017843 A1 | 1/2003 | Noblins | |
| 2003/0050047 A1 | 3/2003 | Ala-Luukko | |
| 2003/0051041 A1 | 3/2003 | Kalavade et al. | |
| 2003/0064723 A1 | 4/2003 | Thakker | |
| 2003/0069922 A1 | 4/2003 | Arunachalam | |
| 2003/0129991 A1 * | 7/2003 | Allison et al. | 455/456 |
| 2003/0133421 A1 | 7/2003 | Sundar et al. | |
| 2003/0139180 A1 | 7/2003 | McIntosh et al. | |
| 2003/0208560 A1 | 11/2003 | Inoue | |
| 2003/0224795 A1 | 12/2003 | Wilhoite et al. | |
| 2003/0229791 A1 | 12/2003 | De Jong | |
| 2004/0019539 A1 | 1/2004 | Raman et al. | |
| 2004/0053610 A1 | 3/2004 | Kim | |
| 2004/0082346 A1 | 4/2004 | Skytt et al. | |
| 2004/0087305 A1 | 5/2004 | Jiang | |
| 2004/0120552 A1 | 6/2004 | Borngraber et al. | |
| 2004/0131023 A1 | 7/2004 | Auterinen | |
| 2004/0132449 A1 | 7/2004 | Kowarsch | |
| 2004/0148400 A1 | 7/2004 | Mostafa | |
| 2004/0196858 A1 | 10/2004 | Tsai et al. | |
| 2004/0224680 A1 | 11/2004 | Jiang | |
| 2004/0229601 A1 | 11/2004 | Zabawskyj et al. | |
| 2004/0236836 A1 | 11/2004 | Appelman | |
| 2005/0021834 A1 | 1/2005 | Coulombe | |
| 2005/0047378 A1 | 3/2005 | Wuschke et al. | |
| 2005/0064883 A1 | 3/2005 | Heck et al. | |
| 2005/0070278 A1 | 3/2005 | Jiang | |
| 2005/0186939 A1 | 8/2005 | Barnea et al. | |
| 2005/0186960 A1 | 8/2005 | Jiang | |
| 2005/0186979 A1 | 8/2005 | McCann et al. | |
| 2005/0192036 A1 | 9/2005 | Greenwood et al. | |
| 2005/0215250 A1 | 9/2005 | Chava et al. | |
| 2005/0232282 A1 | 10/2005 | Silver et al. | |
| 2005/0250493 A1 | 11/2005 | Elkarat et al. | |
| 2006/0003775 A1 | 1/2006 | Bull et al. | |
| 2006/0009204 A1 | 1/2006 | Ophir | |
| 2006/0025129 A1 | 2/2006 | Wolfman et al. | |
| 2006/0052113 A1 | 3/2006 | Ophir et al. | |
| 2006/0068778 A1 | 3/2006 | Della-Torre | |
| 2006/0068786 A1 | 3/2006 | Florence | |
| 2006/0079225 A1 | 4/2006 | Wolfman et al. | |
| 2006/0079236 A1 | 4/2006 | Del Pino et al. | |
| 2006/0148459 A1 | 7/2006 | Wolfman et al. | |
| 2006/0205404 A1 | 9/2006 | Gonen et al. | |
| 2006/0211420 A1 | 9/2006 | Ophir et al. | |
| 2007/0021118 A1 | 1/2007 | Ophir et al. | |
| 2007/0049269 A1 | 3/2007 | Ophir et al. | |
| 2007/0054665 A1 | 3/2007 | Elkarat et al. | |
| 2007/0072587 A1 | 3/2007 | Della-Torre et al. | |
| 2007/0178885 A1 | 8/2007 | Lev et al. | |
| 2007/0232300 A1 | 10/2007 | Wolfman | |
| 2007/0259663 A1 | 11/2007 | Weintraub et al. | |
| 2008/0020760 A1 | 1/2008 | Elkarat et al. | |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO2004/075598 | 9/2004 |
| WO | WO 2004/081802 | 9/2004 |
| WO | WO2005/101857 | 10/2005 |
| WO | WO2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brunen, M. "Roaming im Zugangsnetz Mit OWLAN uberall zu Hause sein," Net-Zeitschrift Fuer Kommunikationsmangement, Huthig Verlag, Heilderberg, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station MS in Idle Mode" ETSI TS 123 122 V3.1.0, Jan. 2000, pp. 1-33.

"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.

GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).

GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).

GSM 902 on MAP Specification Digital Cellular Telecommunications (Phase 2+); Mobile Application Part (MAP) Specification (3GPP TS 09.02 version 7.9.0 Release 1998).

Q 764 (1999), Signaling System No. 7—ISDN User Part signaling procedures.

Q 730 (1999), ISDN User Part supplementary services.

Q 711 (1996), Functional description of signaling connection control part.

Q 712 (1996), Definition and function of signaling connection control part messages.

Q713 (1996), Signaling connection control part formats and codes.

Q 714 (1996), Signal connection control part procedures.

Q 716 (1993), Signaling Connection Control Part (SCCP) performance.

GSM 340 on SMS Digital cellular telecommunications system (Phase 2+); Technical realization of the Short Message Service (SMS); (GSM 03.40 version 7.4.0 Release 1998).

SMPP Forum: SMPP Protocol Document Version:—Oct. 12, 1999 Issue 1.2.

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).

Technical Specification3$^{rd}$ Generation Partnership Project; Technical Specification Group Services and System Aspects; Service accessibility (Release 1999).

Signaling procedure and the Mobile Application Part (MAP) (Release 1999).

GMS 408 on radio interface layer 3; Digital cellular telecommunications system (Phase 2+); Mobile radio interface layer 3 specification (GSM 04.08 version 7.4.2 Release 1998).

GSM 322 network selection Digital cellular telecommunications system (Phase 2+); functions related to Mobile Station (MS) in idle mode and group receive mode (GSM 03.22 version 8.3.0 Release 1999).

GSM 23122 network selection 3GPP TS 23.122 V3.9.0 (Dec. 2002) Technical Specification; 3$^{rd}$ Generation Partnership Project; Technical Specification Group Core Network; NAS Functions related to Mobile Station (MS) in idle mode (release 1999).

GSM 22011 service accessibility; 3 GPP TS 22.011 V3.8.0 (Sep. 2002) Technical Specification; 3$^{rd}$ Generation Partnership Project; Technical Specification Group Services and System Aspects; Service accessibility (Release 1999).

GSM 318 on CAMEL Basic Call Handling; Digital cellular telecommunications system (Phase 2+) Basic call handling; Technical realization (GSM 03.18 version 6.6.0 Release 1997).

ITU-T Recommendation Q. 766 (1993), Performance objectives in the integrated services digital network application.

ITU-T Recommendation Q. 765 (1998), Signaling system No. 7—Application transport mechanism.

ITU-T Recommendation Q. 769.1 (1999), Signaling system No. 7—ISDN user part enhancements for the support of Number Portability.

* cited by examiner

METHOD, SYSTEM AND COMPUTER PROGRAM PRODUCT FOR COUNTERING ANTI-TRAFFIC REDIRECTION

RELATED APPLICATIONS

This application claims priority from U.S. Provisional Patent Application Ser. No. 60/662,031 entitled "Method and Apparatus for Defense Against Defense Against Network Traffic Redirection", filed Mar. 14, 2005 and is a continuation-in-part of United States Patent Application entitled "Method And System For Cellular Network Traffic Redirection" application Ser. No. 10/635,804 filed on Aug. 5, 2003 now U.S. Pat. No. 7,072,651, claiming priority from Aug. 5, 2002. Both of those patent applications in their entirety are incorporated herein by this reference.

BACKGROUND

1. Field of the Invention

The present invention relates to traffic redirection in a wireless network. More particularly the invention discloses a method, system and program product to counter anti-traffic redirection mechanisms.

2. Background of the Technology

Wireless communication networks have become an integral part of today's digital lifestyle. The necessity and the desire to remain connected at all points of time has resulted in wireless operators expanding their networks to almost all conceivable parts of the world.

Different standards and protocols have been adopted in the industry, depending upon the users' requirement and the preference of the operators in a particular geographical location. Some of the popular technologies that are present in this domain include GSM, GPRS, 3G, CDMA, WCDMA, TDMA, WLL, WiFi, WiMax and VoIP. All of these technologies have their merits and shortcomings and provide a gamut of voice based and data based services. A network operator may be providing one or more of voice/data service using one or a combination of the aforementioned technologies.

In order to prevent monopoly of a service provider, various geographical zones are allotted to one or more network operators. These operators usually provide competitive services in their zone. A particular network operator may be present in more than one geographical zone. In order to provide seamless service to a subscriber, the network operators not only cater to the subscribers directly registered with them but also to their subscribers from other zones and/or the subscribers of other network operators with whom they have a "roaming" agreement. Often, those roaming arrangements are bilateral, such that the subscribers of each geographically diverse operator are enabled to receive roaming service within the zone of the other operator. The network with which the subscriber has a direct relationship is called the subscriber's Home Network. Any other network in which the user may roam is called the Visiting Network. The subscriber is referred to as an outbound roamer from the perspective of the Home Network and an inbound roamer from the perspective of the Visited Network.

As mentioned above, at any given geographical location, there maybe more than one network operator providing one or more kinds of service. The home network of the roaming user may prefer one visited network over another, or may want to allocate varying percentages of their outbound roamers' traffic to different operators. Various factors such as commercial terms, quality of service, range of service and the like would dictate such a preference or roaming distribution. Under ideal scenario the home network would make all possible efforts to ensure that its outbound roamers register to the visited network operator that it prefers in that case.

Traffic Redirection (TR) or Steering of Roaming (SoR) is a method by which the home network operators use the messages exchanged in a Mobile Application Part (MAP) based signaling scheme so as to steer their subscribers to attempt connection with the preferred network/s according to some logics or distribution. The term preferred network is used herein, to refer either static preferences of one network over another or dynamic preference of one network over another based on some logics or distribution (e.g. subscriber profiles, the visiting country, current distribution of outbound roamers in the country).

Due to the magnitude of revenues generated through inbound roaming, operators are always motivated to capture the maximum amount possible of inbound roaming traffic. Billboards and advertisements at airports and borders, and the competition among operators to install the most powerful transmitters at those locations bear witness to that. With the advent of Steering of Roaming, operators today are motivated to disrupt traffic redirection attempts and try to cause inbound roamers to register automatically with their networks. This not only results in loss of revenues to the home network operator but also may not provide the subscriber the best quality and range of services as desired by the home network operator.

There is a need in the art for a method and system that counters the anti-traffic redirection attempts and steers roamers back to the preferred networks.

BRIEF DESCRIPTION OF THE FIGURES

In the drawings, the same or similar reference numbers identify similar elements or acts.

DETAILED DESCRIPTION

Figure 1:
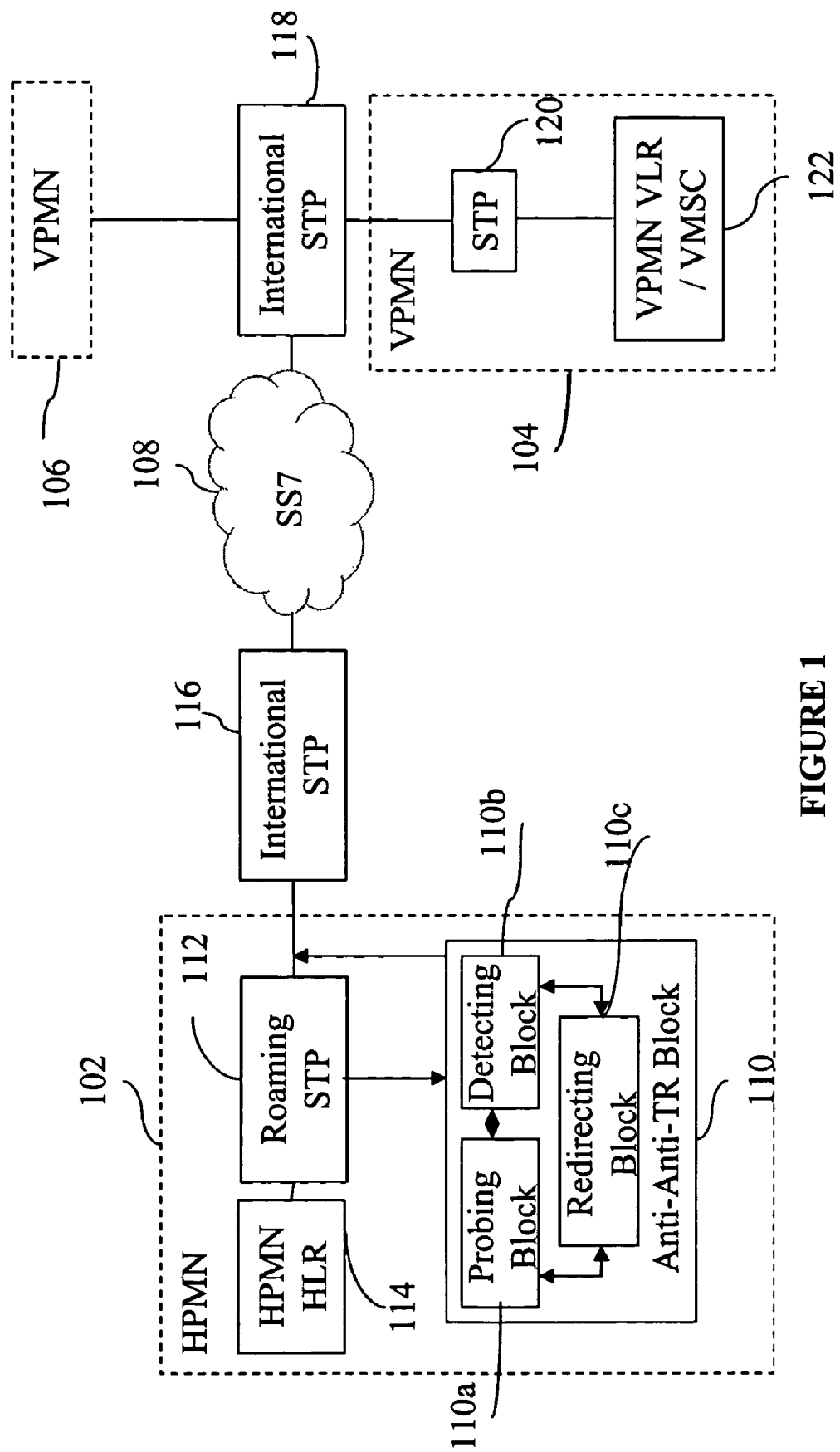
FIG. 1 is a block diagram of an embodiment of the anti-anti-Traffic Redirection system.

A method for detecting the anti-TR mechanism and redirecting the roamer to a preferred network is disclosed. The method detects the presence of an anti-TR solution by observing one or more registration messages exchanged by a visiting network and a home network. The method includes steps to steer the roamer to reattempt connection with the preferred networks by sending appropriate registration response messages in response to the observed registration messages.

The invention also discloses a system for detecting the anti-TR mechanism and redirecting the roamer to a preferred network. The system includes a probing block to observe the registration messages exchanged between the Home Network and the Visiting Network. The system further includes a detection block to detect the presence of an anti-TR mechanism deployed at the visiting network, based on the registration messages as observed by the probing block. The invention also provides for a redirection module that attempts to redirect the roamer to attempt reconnection with a preferred visiting network.

Various embodiments are disclosed herein, which counter the various approaches that an anti-TR mechanism may take so as to fail the TR mechanism of the home network.

A computer program product for realising the aforementioned method is also claimed herein.

The following description provides specific details for a thorough understanding and an enabling description for various embodiments of Anti-Traffic Redirection Countering System (ATRCS). However, one skilled in the art will understand that the ATRCS may be practiced without these details. In other instances, well-known structures and functions have not been shown or described in detail to avoid unnecessarily obscuring the description of the embodiments of the ATRCS. The headings provided herein are for illustrative purposes only and do not affect the scope or meaning of the claimed invention. An Appendix includes an explanation of numerous acronyms used herein and is included below for reference. Therefore, the acronyms used may not be spelled out in the body of the document.

The invention would now be described with reference to the accompanying figures. Although the invention is being described with GSM as the underlying technology and focus, the inventive concept is equally applicable in other wireless technologies such as CDMA, WCDMA, WiFi, WiFiMax, VoIP etc. In context of a cell-based GSM network, the home network has been referred to as Home Public Mobile Network (HPMN) and the visiting network has been referred to as Visiting Public Mobile Network (VPMN). Furthermore the HPMN and VPMN may both have more than one network operators wherein the HPMN may prefer certain VPMN network operators to the others. The terms HPMN/HPMN network/HPMN network operator and VPMN/VPMN network/VPMN network operator have been used interchangeably throughout this specification and their intended meaning is driven by the context in which they have been used. The term subscriber is used herein to indicate a user that registers with a network. The subscriber that registers with a network can be any combination of hardware and software capable of registering on a wireless network, e.g., a personal digital assistant (PDA) or a personal computer (PC).

The methods and system disclosed herein use the Mobile Application Part (MAP)-signaling messages exchanged between the VPMN and the HPMN to detect any anti-TR solutions deployed by the visiting network and thereafter steer the roamer to attempt reconnection with the preferred network.

FIG. 1 illustrates a block diagram of a system in accordance with an embodiment of the present invention. System comprises a HPMN 102 communicating with VPMNs 104 and 106 via a SS7 interface 108. Although the embodiment is described illustrating communication between one HPMN and two VPMNs, a number of VPMNs may be communicating with HPMN 102. Out of these VPMNs, some may be the preferred VPMNs of HPMN. In this illustrative embodiment, VPMN 106 is the preferred VPMN and VPMN 104 is the non-preferred VPMN that has deployed an anti-TR solution. HPMN 102 comprises an anti-anti-TR block 110, an HPMN Roaming Signal Transfer Point (STP) 112, and an HPMN HLR 114. Anti-anti-TR block 110 and HPMN HLR 114 are coupled to HPMN Roaming STP 112. Anti-anti-TR block comprises of three modules, a probing block 110a, a detecting block 110b and a redirecting block 110c. The functions of these blocks has been discussed in detail below. These blocks are logical blocks and may be present as one single entity or may be formed by one or more logical/physical entities. System further comprises an international STP 116, corresponding with HPMN 102, to route the signals to another international STP 118 that corresponds with VPMNs 104 and 106. VPMN 104 comprises a VPMN STP 120 coupled to a VPMN VLR/VMSC 122. VPMN 106 and other VPMNs would also have a similar structure (not shown in this diagram). HPMN Roaming STP 112 communicates with VPMN STP 120 and VPMN STP 124 via international STP 116, SS7 interface 106 and international STP 118. The aforesaid embodiment is described using the blocks pertinent to the invention, however various other blocks may be present in HPMN and VPMNs.

In accordance with one embodiment of the invention, the HPMN 102 may deploy a TR solution so as to steer its outbound roamers to its preferred VPMNs 106. In order to counter this TR, the non-preferred VPMNs 104 may deploy anti-TR solutions that would try to pull the inbound roamers on to their networks. The anti-TR solution is deployed in the VPMN 104 network either by monitoring the roaming MAP transactions and injecting spurious messages or by intercepting the roaming MAP transactions and faking interactions as if from the roaming handset or the real VPMN VLR.

The invention discloses two possible modes of operation of the anti-anti-TR solution i.e. the monitoring approach and the in-signaling approach.

Monitoring Approach

In an embodiment of the invention, anti-anti-TR module 110 detects the anti-TR attempt by monitoring passively the exchange of at least one registration message between HPMN 102 and VPMN 104. In one embodiment of the invention, probing block 110a observes the registration messages exchanged between HPMN 102 and VPMN 104. The detecting block 110b detects an anti-TR attempt, by observing the type and frequency (explained in detail below) of messages exchanged between HPMN 102 and VPMN 104. In one embodiment of the invention, at least one registration message is a Location Update (LUP) message.

In-signaling Approach

In another embodiment of the invention, anti-anti-TR module 110 detects an anti-TR attempt by actively monitoring the signaling between HPMN 102 and VPMN 104. The anti-anti-TR block actively monitors the exchange of at least one registration message between HPMN 102 and VPMN 104. Active monitoring is hereinafter referred interchangeably as in-signaling mode. In the in-signaling mode the anti-anti-TR block 110 is deployed on roaming SS7 path by configuring HPMN's 102 roaming STP 112 to route roaming SCCP traffic through anti-anti-TR module 110.

It will apparent to a person skilled in the art, that different routing methods can be used without affecting the working of the system or method as disclosed herein.

FIG. 1 depicts both the monitoring based and in-signaling path based anti-anti-TR architecture. In the case of monitoring-based anti-anti-TR solution, there will be an additional tapping of international roaming links between HPMN and international signal carriers. In the case of in-signaling path based anti-anti-TR solution, roaming SS7 messages from any VPMN are redirected thru the anti-anti-TR block 110 by the HPMN Roaming STP 112. Whatever deployment option is chosen, the anti-anti-TR detection mechanism will receive an outbound roamer's Location update transaction between VPMN 104, 106 and HPMN 102. In both cases however, the anti-anti-TR block 110 will inject or modify MAP transactions on outbound roamers.

If the roamer still succeeded to register on the non-preferred VPMN network after a HPMN anti-anti-TR solution, then HPMN 102 can deduce the failure of the HPMN TR/anti-anti-TR solution and the success of the VPMN anti-TR solution. If the roamer failed to register on the VPMN network 104 after the anti-anti-TR solution, then HPMN 102 can deduce the success of the HPMN TR/anti-anti-TR solution and the failure of the VPMN anti-TR solution.

Based on these deductions and subsequent success or failure of HPMN TR/anti-anti-TR, HPMN 102 can produce all kinds of reports such as signaling load overhead, TR/anti-anti-TR success/failure, percentage of redirected outbound roaming traffic etc.

The anti-TR solution deployed by VPMN 104, may take one or more approaches. We now explain each of these approaches and how the instant invention's anti-anti-TR solution counters each of these approaches.

Fake Manual Mode or No-Coverage Detection Defense

A basic idea for implementing an anti-TR solution at a VPMN is to fool the HPMN TR to think that the handset is operating in manual mode or the VPMN is the only network in coverage. This is achieved by repeatedly sending a location update on the same network location despite more than 4 location update rejections from the HPMN TR already.

Since TR should not try to reject registration of devices in a manual selection or if the VPMN is the only network in coverage, recognition of this mode of an outbound roaming device is important. To avoid bad customer experience, the current TR solution deduces the manual mode or VPMN-only coverage if the outbound roamer's location update from the same VMSC/VLR of the VPMN comes back the fifth time despite rejected the previous 4 times consecutively. This makes it easier for the anti-TR solution of a VPMN operator to fake the manual mode or VPMN-only coverage on behalf of the inbound roaming device.

However the anti-TR solution generally cannot hold for a long time to respond to the registration of an inbound roaming device. This is because the handset might move to another network or try another registration anyway if its registration attempt is timed out. The anti-TR solution also cannot easily select some random or configurable intervals to fake new location update since inter-location update intervals are very unpredictable. These intervals not only vary among different handset types, but also can have a small range even for the same handset type. It is also possible that inter network location update intervals can vary between different operators/networks. Furthermore, inter network location update intervals might also vary among different handset types but also can have a small range even for the same handset type. The most likely scenario for an anti-TR solution to do by a VPMN, after suspecting the response to the first location update from the device is a TR attempt, is to fairly rapidly fire one or more location update in succession, on the same VMSC/VLR on behalf of the inbound roaming device at the VPMN.

For example, if the anti-TR solution fires 3 more location updates after the first TR reject, then the total TR rejects will be 4. The handset will then try another location update on the same location; the HPMN TR solution will allow the location update. For another example, if the anti-TR solution fires one more location update after the first reject, then the total TR rejects will be 2 at the moment. The handset will then try 3 more location updates on the same location. The HPMN TR solution will allow the last location update normally.

To counter such a tactic, the anti-anti-TR solution keeps the original TR mechanism of deducing the manual mode or VPMN-only coverage but does not count a location update that comes within a configurable threshold time interval, for example within 15 seconds, after a previous location update is rejected.

Figure 2:
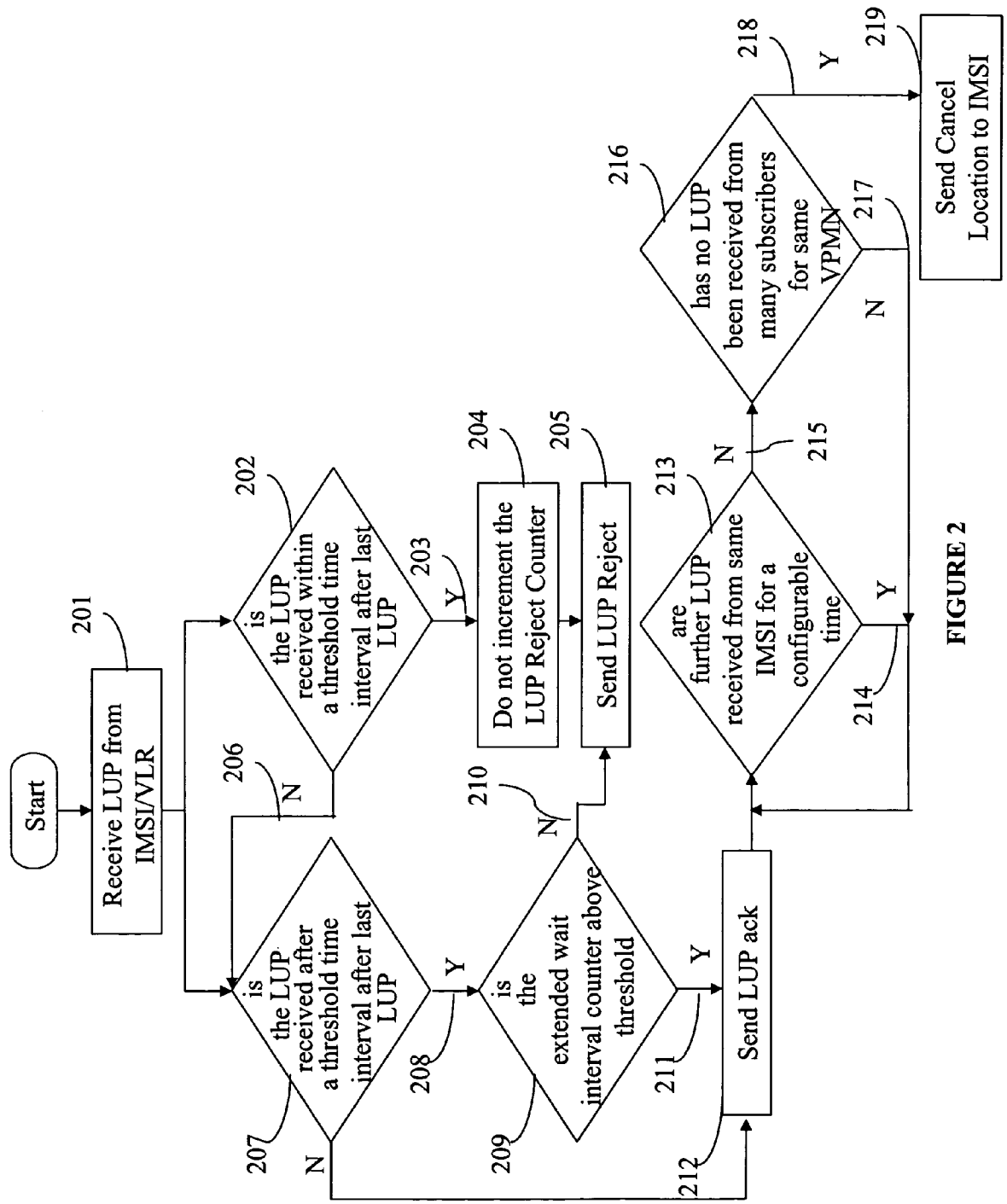
FIG. 2 is a flowchart illustrating the method for countering an anti-TR approach, as per some embodiments of the invention.

FIG. 2 illustrates some countering approaches for an anti-TR solution deployed by non-preferred VPMN 104. FIG. 2 shows these approaches in conjunction with each other. However these individual approaches may be implemented in isolation or in any combination along with other approaches for anti-anti-TR.

As mentioned before the anti-anti-TR block 110 receives LUP messages by either monitoring the SS7 link between the Roaming STP 112 and International STP 116 or by the redirected messages from roaming STP 112. The LUP messages from a particular IMSI are received at step 201. At 202 it is checked if the LUP message for the same IMSI from the same VMSC/VLR 122 is received within a configurable threshold time interval. If it is found so 203 then HPMN 102 does not increment the LUP reject counter 204 but sends a LUP reject 205. If the LUP is received after the threshold time either HPMN 102 may acknowledge the same or may opt to check for other anti-TR approaches 206.

The anti-anti-TR block 110 can detect if the interval between location updates of the same outbound IMSI is shorter than the configurable threshold time interval. When a new location update comes within such a configurable threshold time interval, the TR rejection to the location update is not counted in the rejection counter. In this way, even though the anti-anti-TR enhanced HPMN TR might have received 5 consecutive Location Update attempts from the same IMSI on the same VMSC/VLR 122, it will not treat the roaming device in manual mode and will continue to reject the LUP when some of the inter-LUP attempts come within the configurable threshold time interval.

In an exemplary embodiment of the invention, the configurable threshold time interval may be changed periodically.

In a further embodiment of the invention, anti-anti-TR block 110 may statistically change the configurable threshold time interval over a period of time. This statistical calculation may be based on the frequency of LUPs received from various VMSC/VLR. Such a solution provides robustness against anti-TR solution detecting the configurable threshold time interval.

Figure 3:
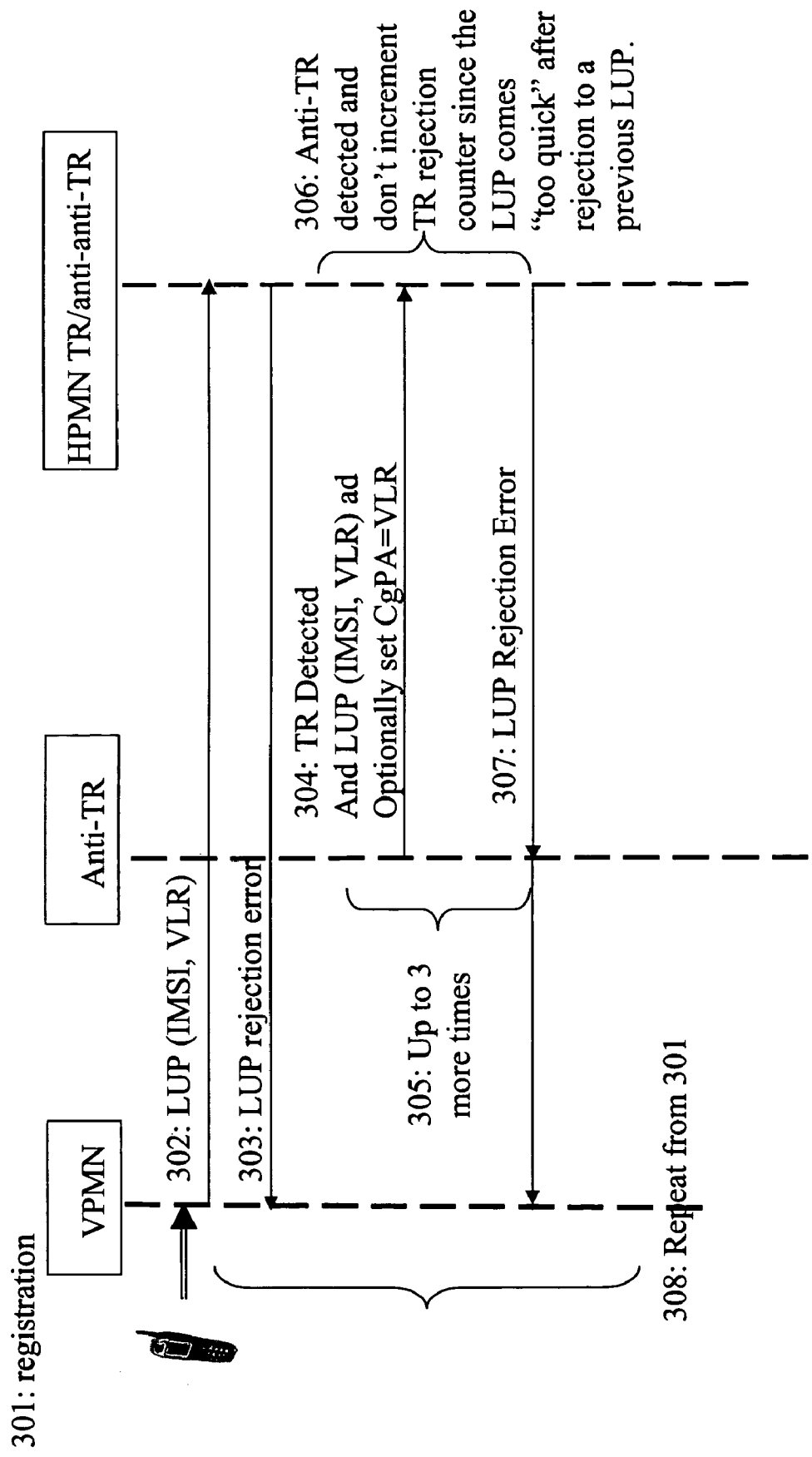
FIG. 3 shows the signal flow for countering an anti-TR approach that fakes manual mode of the handset or fakes the scenario of being the only network available.

FIG. 3 shows the exchange of signals for the aforementioned scenario. At 301 a mobile station/handset initiates registration with a non-preferred VPMN 104. Thereafter VPMN 104 sends a LUP 302 to HPMN 102. Since HPMN has deployed a TR solution, it refuses the update and sends a LUP reject message 303. The anti-TR solution of VPMN 104 detects the TR 304 and sends 3 more LUP messages 305 from same IMSI/VLR or may set the Calling Party Address (CgPA) as VLR. The number of LUP messages sent would depend upon the threshold number after which HPMN 102 would accept the LUP. However, since VPMN 104 cannot hold on to the mobile station for long as the roamer may initiate a new location LUP manually in the mean time, therefore VPMN 104 sends further LUP messages in quick succession. Upon receipt of a consecutive LUP message from same VMSC/VLR, anti-anti-TR block 110 would check if it has come within the configurable threshold time interval. If it has, then anti-TR would be detected 306 and LUP rejection error would be sent 307, without incrementing the LUP rejection counter. This way the mobile station would effectively be reinitiating the registration process in a normal manner 308 despite of anti-TR solution intercepting in between.

This anti-anti-TR solution works in both the in-signaling path mode of TR and the monitoring mode of TR.

Special Handset Detection and Defense

Another approach taken by an anti-TR solution is to fool HPMN 102 to think that the handset/mobile station is special, by extending the interval between location updates on the same VPMN 104 VLR/VMSC 122 of the same network or by extending the interval between location updates between networks. Normally to avoid bad customer experience, the HPMN 102 will allow subsequent location update to succeed.

To defend against this anti-TR tactic, the HPMN 102 anti-anti-TR block 110 on receipt of an LUP from an IMSI/VLR 201, would check if it is received after a threshold time period after the last LUP 207. This threshold time period is a configurable extended. time period up to which HPMN 102 would wait without assuming the mobile station to be a special handset and therefore issue an LUP ack. For example this configurable extended time period may be about 2 (or more) times of the normal interval (e.g. 30 secs, configured by the anti-anti-TR solution) between location updates. If the LUP is received within the extended time period, anti-anti-TR 110 would still reject the LUP. However to avoid bad customer experience, HPMN 102 will only wait for this extended interval for a configurable number (e.g. 1) of times, in general, less than 2 times. Therefore once it is determined 208 that the LUP is received within the configurable extended time interval, it is checked if the extended time interval has been exercised more than the configurable number of times 209. If yes 211, then a LUP ack is sent 212 to VPMN 104. If no 210, then a LUP reject is sent 205 and the extended time interval counter is incremented by one (not shown in figure).

Figure 4:
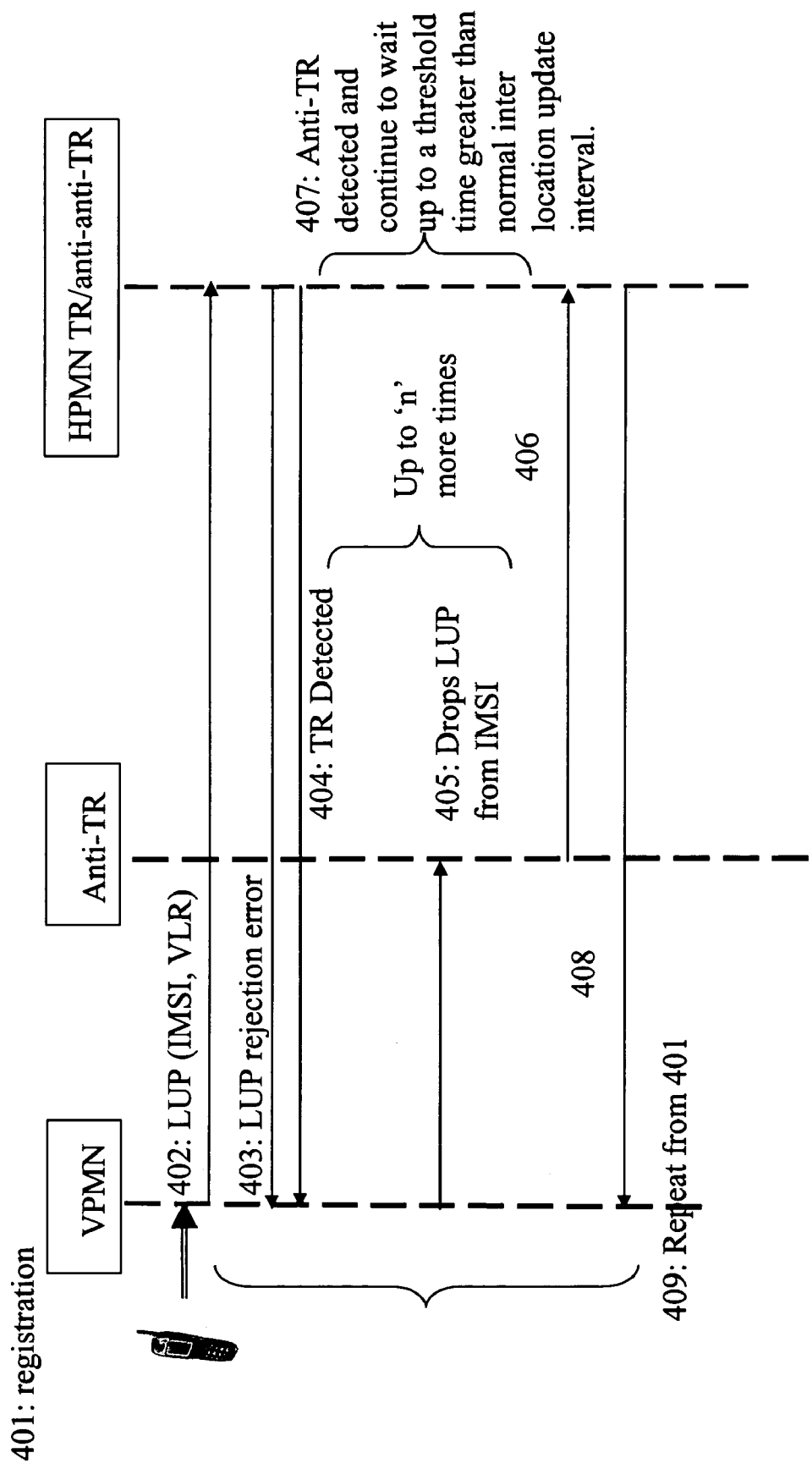
FIG. 4 shows the signal flow for countering an anti-TR approach that fakes the presence of a special handset.

FIG. 4 shows the exchange of signals for the aforementioned scenario. At 401 the mobile station initiates registration with VPMN 104 and VPMN 104 sends LUP (with IMSI and VLR information) message 402 to HPMN 102. Since HPMN 102 deploys TR, it rejects the LUP received 403 from a non-preferred VPMN 104. This way VPMN 104 detects the presence of a TR solution 404. Thereafter anti-TR block of VPMN 104 drops LUP messages from same IMSI for 'n' number of times 405 and follows it up by sending a LUP message 406 thereby extending the period between two consecutive LUPs so as to fool HPMN 102 to treat the mobile station as special handset. However because of the aforementioned algorithm HPMN 102 still sends a reject message 408 to VPMN 104. This way the mobile station would effectively be reinitiating the registration process in a normal manner 409 despite of anti-TR solution intercepting in between.

This anti-anti-TR solution works in both the in-signaling path mode of TR and the monitoring mode of TR.

Detect and Defense Against a GLR-based Anti-TR Solution

Another basic idea of anti-TR is to avoid subsequent location update between VPMN 104 and HPMN 102 by using a Global Location Register (GLR) to store the first location update profile in the VPMN network. In this way, if by any chance that the roamer succeeded in registering at VPMN 104 despite the HPMN's TR attempt, the GLR can avoid the onslaught of HPMN 102 TR in subsequent location update by the roamer at the same VPMN 104.

In order to detect the use of GLR as an anti-TR solution, HPMN's 102 anti-anti-TR solution 110 would check if a first successful location update of an outbound roamer on VPMN 104 is followed by a subsequent location update for the same IMSI on same VPMN 104 or any other VPMN, within a configurable time interval 213, for example 10 minutes. HPMN 102 also checks if similar non-receipt of LUPs has been happening for many subscribers 216 on a particular VPMN 104. The number of subscribers for checking this condition may either be a fixed number, which in a very watchful mode maybe 1 i.e. even if one subscriber does not update the location within the configurable time interval then a corrective action would be taken. However a more rational approach may be more calculative, in which the number of subscribers to be checked maybe a ratio of the total number of subscribers registered with the particular VPMN 104. If the above two conditions are not satisfied i.e. subsequent LUPs have been received 214 and even if they have not been received from few IMSI 217, then HPMN 102 assumes no GLR based anti-TR solution deployed. However, if it is found that subsequent LUPs have not been received within the configurable time 215 and the same has been happening for a number of subscribers 219 then HPMN 102 would send a Cancel Location message 219 to IMSI.

After the detection of GLR based anti-TR solution, the anti-anti-TR solution will wait for a configurable interval (for example 10 minutes) to issue a MAP Cancel-Location each time a location update at the VPMN (found out to be deploying GLR based anti-TR) from an outbound roaming device is successful. Note that the Home Location Register (HLR) of the roaming device still has the real VPMN VLR/VMSC entry. In this way, for any Mobile Originated (MO)-activity with the VPMN, the handset will be forced to make a new location update on the VPMN. For any Mobile Terminate (MT) call to an outbound roamer, the HPMN HLR will issue MAP PRN to the outbound roamer's real VLR, which returns the MSRN. If the VPMN VLR entry of the roamer is empty, the VPMN VLR will issue a MAP RestoreData to HPMN HLR. The anti-anti-TR solution will wait for a configurable interval to issue another MAP Cancel-Location on the outbound roamer to the VPMN VLR after the RestoreData. For any MT SMS to an outbound roamer, the HPMN HLR will return the outbound roamer's real VPMN VMSC to the originating SMSC. The originating SMSC will then send the message to the real VPMN VMSC. If the VPMN VLR entry is empty, the SMSC will receive an error ack and can then report the delivery status to the roamer's HPMN HLR for future delivery.

Figure 5:
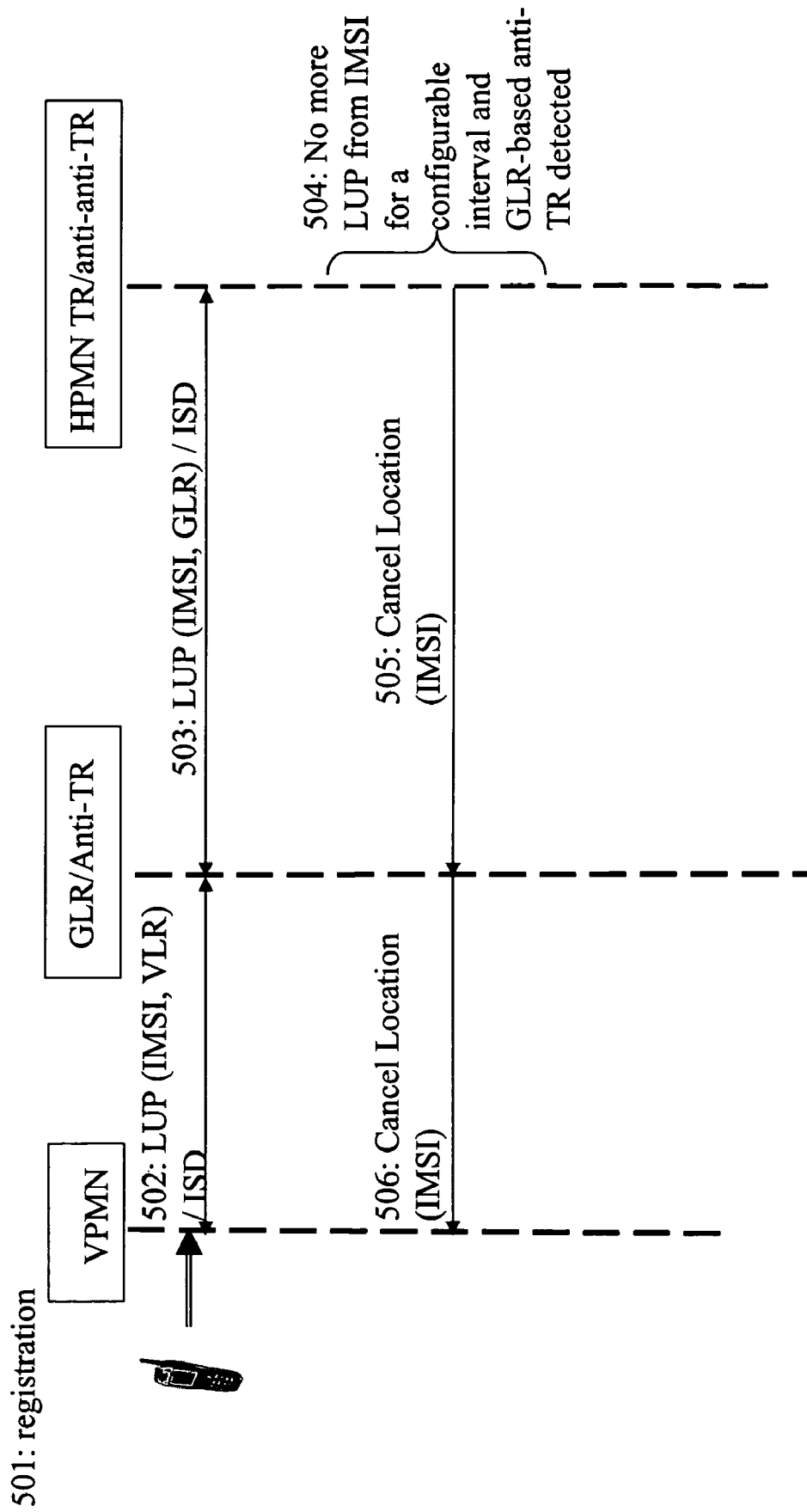
FIG. 5 shows the signal flow for countering a GLR based anti-TR.

FIG. 5 shows the exchange of signals for the aforementioned scenario. At 501 a roaming mobile station registers with VPMN 104. VPMN 104 sends a LUP message 501 to HPMN 102. The location Update profile of the roamer sent by HPMN 102 is stored by VPMN at GLR 503. Thereafter for very subsequent LUP from IMSI, VPMN 104 would use the stored profile to acknowledge. Upon discovering that no subsequent LUPs have been received from an IMSI after a successful LUP and a similar occurrence for a number of IMSIs on same VPMN 104, HPMN 102 deduces that a GLR based anti-TR solution has been deployed 504. It then sends a Cancel Location message 505, 506 to the IMSI who have not been updated for a long period of time on VPMN 104 having GLR based anti-TR solution.

This anti-anti-TR solution works in both the in-signaling path mode of TR and the monitoring mode of TR.

We would now explain certain approaches to anti-TR that would work in the in-signaling mode only:

Roaming Restricted

In a TR mechanism employing in-signaling approach, a Roaming Restricted error code can also be used is response to a LUP message. Although this temporarily, puts the network location area as forbidden in the handset, it results in a faster network reselection. To defend against this TR, the anti-TR solution can perform just TCAP abort or just TCAP reject the Roaming Restricted in the MAP ISD message with unexpected data value or unsupported service etc in ISD ACK.

To counter against this anti-TR tactic, whenever the ISD RR is not honored due to a suspecting anti-TR attempt, the anti-anti-TR solution will continue to attempt ISD (RR) for a configurable number of times before trying an alternative TR tactic unless the VPMN is genuinely recognized as a RR non-supporting network. If it is detected that some of the ISD ack messages from the same VPMN contain RR whereas others do not, then in may be inferred that an anti-TR solution is deployed by the VPMN.

Roaming Not Allowed

In a TR mechanism employing in-signaling approach, a Roaming Not Allowed error code can also be used in response to a LUP message. Although this puts the network as forbidden in the SIM of a handset, it results in a faster network reselection. To defend against this TR, the anti-TR solution can just drop the LUP ack/error message and immediately issues another LUP message on the same transaction of the first LUP message that got the LUP error of Roaming Not Allowed. In this way, the HPMN TR may deduce that the handset has manually selected the same not allowed network again and could have allowed the registration to be successful.

To counter against this anti-TR tactic, the in-signal-path anti-anti-TR solution will continue to issue RNA to a location update if it comes back within a configurable interval (for example 20 seconds) of the previous location update that got rejected with the RNA error.

Defense Against an Anti-TR Solution to OTA/SIM Approach

In order to defend against a HPMN 102 deploying OTA based TR mechanism, a VPMN 104 simplistically blocks all the OTA messages from HPMN 102 to its outbound roamers.

So as to counter the above, in one embodiment of the invention, HPMN 102 would respond by sending RNA error code in the LUP response to a LUP request from an outbound roamer registered/attempting registration with VPMN 104 deploying anti-TR solution to OTA/SIM approach. Once the roamer registers with an alternate network, HPMN 102 can then send OTA messages, steering it to the preferred VPMN 106.

The methods discussed above have the advantage that they are robust against the anti-TR solutions deployed by the VPMN. Since the anti-anti-TR solution as explained herein works by observing the type and frequency of the registration messages exchanged between the HPMN and the VPMN, and is not focused on countering any particular approach/logic that may have been implemented by the anti-TR solution, therefore it would be difficult to apply a logic to counter the anti-anti-TR mechanism as disclosed herein.

A computer usable medium claimed herein includes computer usable program code, which when executed counters the anti-TR solution as deployed by the VPMN. The anti-TR attempt is detected by observing exchange of at least one registration message between the VPMN and the HPMN. The computer usable medium further includes computer usable program code for redirecting the roamer to attempt reconnection with a preferred network.

The components of Anti-Traffic Redirection Countering System (ATRCS) described above include any combination of computing components and devices operating together. The components of the ATRCS can also be components or subsystems within a larger computer system or network. The ATRCS components can also be coupled with any number of other components (not shown), for example other buses, controllers, memory devices, and data input/output devices, in any number of combinations. In addition any number or combination of other processor-based components may be carrying out the functions of the ATRCS.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ATRCS is not intended to be exhaustive or to limit the ATRCS to the precise form disclosed. While specific embodiments of, and examples for, the ATRCS are described herein for illustrative purposes, various equivalent modifications are possible within the scope of the ATRCS, as those skilled in the art will recognize. The teachings of the ATRCS provided herein can be applied to other processing systems and methods. They may not be limited to the systems and methods described above.

The elements and acts of the various embodiments described above can be combined to provide further embodiments. These and other changes can be made to the ATRCS in light of the above detailed description.

Other Variations

Provided above for the edification of those of ordinary skill in the art, and not as a limitation on the scope of the invention, are detailed illustrations of a scheme for countering anti-TR between VPMN and HPMN of the roaming mobile station. Numerous variations and modifications within the spirit of the present invention will of course occur to those of ordinary skill in the art in view of the embodiments that have been disclosed. For example the present invention is implemented primarily from the point of view of GSM mobile networks as described in the embodiments. However, notwithstanding, the present invention may also be effectively implemented on CDMA, 3G, WCDMA, GPRS, WiFi, WiMAX, VOIP etc., or any other network of common carrier telecommunications in which end users are normally configured to operate within a "home" network to which they normally subscribe, but have the capability of also operating on other neighboring networks, which may even be across international borders.

The examples under the present invention Anti-Traffic Redirection Countering System (ATRCS) detailed in the illustrative examples contained herein are described using terms and constructs drawn largely from GSM mobile telephony infrastructure. But use of these examples should not be interpreted to limiting the invention to those media. Anti-Traffic Redirection Countering System—a method for countering anti-TR between VPMN and HPMN of the roaming mobile station in a manner that is agnostic to the capabilities of the visited or non-accustomed network can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices,; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the ATRCS under the present invention, this specification follows the path of a telecommunications call from a calling party to a called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

TECHNICAL REFERENCES

GSM 902 on MAP specification
Digital cellular telecommunications system (Phase 2+)
Mobile Application Part (MAP) Specification
(3GPP TS 09.02 version 7.9.0 Release 1998)
Q71X SCCP
Q70X MTP
Q77X TCAP
GSM 1111 SIM and Mobile Interface
GSM 1114 SIM Toolkit
IR 7320 Steering of Roaming
GSM 348 Security and OTA,
GSM 31048 Security and OTA,
GSM 23119 Gateway Location Register,
GSM 408 Mobile Radio Interface Network Layer
GSM 23122 Mobile Station Procedure
GSM 24008 Mobile Radio Interface Network Layer
GSM22011 Service Accessibility
GSM25304 Idle Mode Selection
GSM29010 Error Network Mapping
GSM 29002 MAP Protocol

| Acronym | Description |
| --- | --- |
| 3G | Third generation of mobile |
| BSC | Base Station Controller |
| BCSM | Basic Call State Model |
| CAMEL | Customized Application for Mobile Enhanced Logic |
| CDMA | Code Division Multiplexed Access |
| CLI | Calling Line Identification |
| CAP | Camel Application Part |
| CSI | Camel Subscription Information |
| GMSC | Gateway MSC |

-continued

| Acronym | Description |
| --- | --- |
| GLR | Gateway Location Register |
| GPRS | General Packet Radio System |
| GSM | Global System for Mobile |
| GSM SSF | GSM Service Switching Function |
| HLR | Home Location Register |
| HPLMN | Home Public Land Mobile Network |
| HPMN | Home Public Mobile Network |
| IMSI | International Mobile Subscriber Identity |
| IN | Intelligent Network |
| INAP | Intelligent Network Application Part |
| IDP | Initial DP IN/CAP message |
| ISUP | ISDN User Part |
| MAP | Mobile Application Part |
| MCC | Mobile Country Code |
| MCC | Mobile Country Code |
| MNC | Mobile Network Code |
| MO | Mobile Originated |
| MSC | Mobile Switching Center |
| MSISDN | Mobile Subscriber ISDN Number |
| MSRN | Mobile Subscriber Roaming Number |
| MT | Mobile Terminated |
| NDC | National Dialing Code |
| ODB | Operator Determined Barring |
| OTA | Over The Air |
| O-CSI | Originating CAMEL Subscription Information |
| PRN | Provide Roaming Number |
| RNA | Roaming Not Available |
| RR | Roaming Restricted |
| SIM | Subscriber Identification Module |
| SRI | Send Routing Information |
| SS | Supplementary Services |
| SS7 | Signaling System 7 |
| STP | Signal Transfer Point |
| TCAP | Transaction Capabilities Application Part |
| T-CSI | Terminating CAMEL Service Information |
| VAS | Value Added Service |
| VLR | Visited Location Register |
| VMSC | Visited Mobile Switching Center |
| VPLMN | Visited Public Land Mobile Network |
| VPMN | Visited Public Mobile Network |

I claim:

1. A method for countering an anti-traffic redirection of a roaming mobile station in a Visiting Public Mobile Network (VPMN) by a Home Public Mobile Network (HPMN), the method comprising the steps of:

detecting a forced connection of the roaming mobile station to a non-preferred VPMN by observing exchange of at least one registration message between the VPMN and the HPMN and checking a number of LUP messages received within a configurable threshold time interval;

statistically configuring the threshold time interval based on the number of LUP messages received within the configurable threshold time interval; and steering the roaming mobile station to reinitiate a registration attempt with a preferred VPMN.

2. The method of claim 1, wherein detecting the forced connection comprises passively monitoring the exchange of registration messages between the VPMN and the HPMN.

3. The method of claim 1, wherein detecting the forced connection comprises actively monitoring the exchange of registration messages between the VPMN and the HPMN.

4. The method of claim 1, wherein steering the roaming mobile station comprises sending a Location Update Reject registration message in response to a predefined number of LUP messages received within the configurable threshold time interval.

5. The method of claim 4, wherein the predefined number of LUP messages is one or more.

6. The method of claim 4, wherein the configurable threshold time interval is 15 seconds.

* * * * *